United States Patent
Woodfield

[11] Patent Number: 5,961,574
[45] Date of Patent: Oct. 5, 1999

[54] DEVICE FOR OBTAINING POSITIONAL INFORMATION

[76] Inventor: David Alan Woodfield, Tudor Croft, Bamford Road, Bloxwich, Walsall, West Midlands, United Kingdom

[21] Appl. No.: 09/004,675

[22] Filed: Jan. 8, 1998

[30] Foreign Application Priority Data

Jan. 8, 1997 [GB] United Kingdom .................... 9700225

[51] Int. Cl.$^6$ .................................................. G06F 3/00
[52] U.S. Cl. .......................... 708/141; 178/18.01; 341/5
[58] Field of Search .................................... 708/131, 138, 708/140, 141, 143; 178/18.01, 18.06, 18.07, 20.04, 19.03; 341/5, 20

[56] References Cited

U.S. PATENT DOCUMENTS

| | | | |
|---|---|---|---|
| 4,743,902 | 5/1988 | Andermo | 324/660 |
| 4,879,556 | 11/1989 | Duimel | 341/20 |
| 5,736,865 | 4/1998 | Nelson et al. | 324/660 |
| 5,872,408 | 2/1999 | Rakow | 310/68 B |

*Primary Examiner*—Chuong Dinh Ngo
*Attorney, Agent, or Firm*—Marshall, O'Toole, Gerstein, Murray & Borun

[57] ABSTRACT

A device (10) for obtaining information relating to the relative positions of first and second members (11, 12), the first member (11) comprising at least three isolated electrically conducting parts (13–16), and the second member (12) being electrically conducting and adjacent to and capacitively coupled to the first member (11), the first and second members (11, 12) being relatively movable such that the proportions of each of the respective parts (13–16) of the first member (11) in overlapping relationship with the second member (12) may be varied, oscillator means (25) to provide a first waveform signal (26) to one of the parts (13–16) of the first member (11) and a second waveform signal (27) to another of the parts (13–16) of the first member (11), means (40) to analyze a signal arising in the capacitively coupled second member (12) to provide a device output signal (50) containing positional information and characterized in that a switch means (31) is provided whereby when the switch means (31) is in a first condition the first waveform signal (26) is selectively applied to a first part (16) of the first member (11) while the second waveform signal (27) is applied to a second part (15) of the first member (11) so that the device output signal (50) contains information relating to the relative positions of the first and second members (11, 12) in a first direction (33), and when the switch means (31) is in a second condition the first waveform signal (26) is applied to another part (14) of the first member (11) while the second waveform signal is applied to another one of the parts (15) of the first member so that the device output signal (50) contains information relating to the relative positions of the first (11) and second (12) members in a second direction (34).

9 Claims, 2 Drawing Sheets

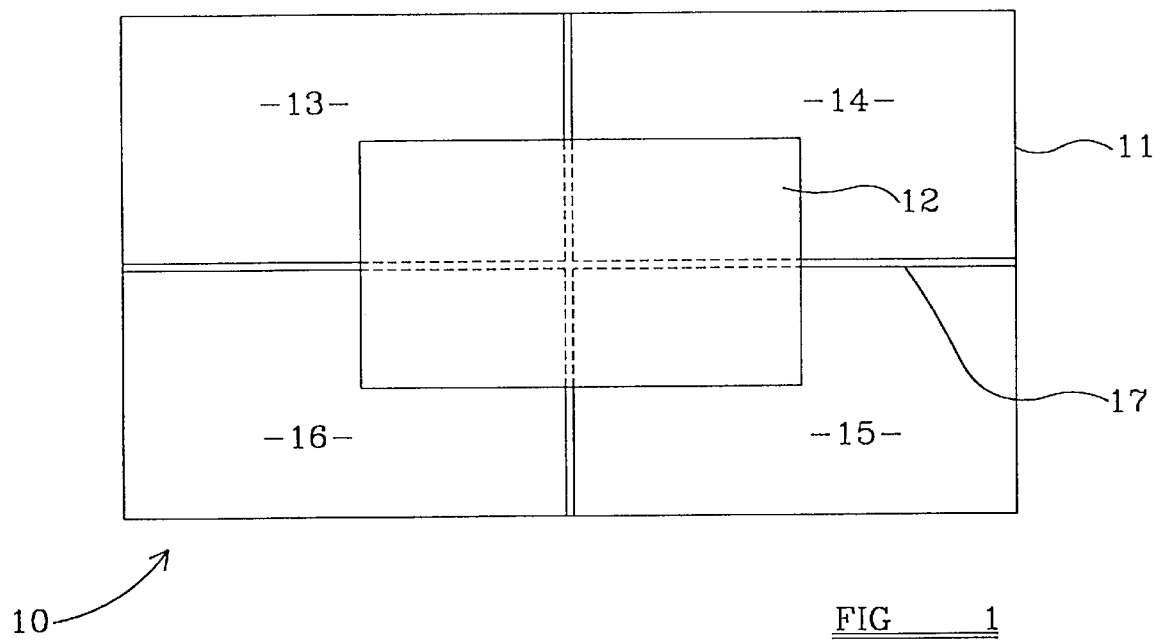
FIG 1
FIG 2
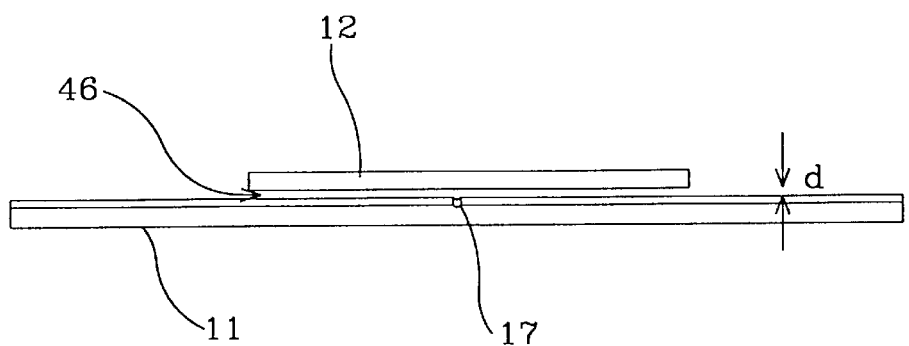

DEVICE FOR OBTAINING POSITIONAL INFORMATION

FIELD OF THE INVENTION

This invention relates to a device for obtaining information relating to the relative positions of first and second members and may be used for example only as a device for inputting positional information into a computer, controller, game playing console or the like.

DESCRIPTION OF THE PRIOR ART

Conventional such inputting devices tend to rely on wiping rolling contacts and/or resistive films, each of which are prone to wear.

It has been proposed in for example, GB-A-872152 to determine positional information along a single axis by sensing the difference in phasing between a signal applied to a first member and a signal arising in a capacitively coupled second member. In GB-A-1083222 a similar principle is used to determine angular relative movement about a rotational axis.

Inputting devices for computers, controllers and game playing consoles and the like are required to provide positional information about relative movement along two direction, particularly but not exclusively X-Y directions.

SUMMARY OF THE INVENTION

According to one aspect of the present invention I provide a device for obtaining information relating to the relative positions of first and second members, the first member comprising at least three isolated electrically conducting parts, and the second member being electrically conducting and adjacent to and capacitively coupled to the first member, the first and second members being relatively movable such that the proportions of each of the respective parts of the first member in overlapping relationship with the second member may be varied, oscillator means to provide a first waveform signal to one of the parts of the first member and a second waveform signal to another of the parts of the first member, means to analyse a signal arising in the capacitively coupled second member to provide a device output signal containing positional information and characterised in that a switch means is provided whereby when the switch means is in a first condition the first waveform signal is selectively applied to a first part of the first member while the second waveform signal is applied to a second part of the first member so that the device output signal contains information relating to the relative positions of the first and second members in a first direction, and when the switch means is in a second condition the first waveform signal is applied to another part of the first member while the second waveform signal is applied to a different part of the first member so that the device output signal contains information relating to the relative positions of the first and second members in a second direction.

Thus utilising the present invention, the principle of using capacitive coupling between two members to achieve relative positional information may conveniently be employed to achieve information about the relative positions of the first and second members in two directions, particularly but not exclusively X-Y directions, without requiring any wiping or rolling contact between the first and second members.

Usually, when the switch means is in the second condition the second waveform signal is applied to the second part of the first member so that the positional information relating to the relative positions of the first and second members in the first and second directions can be related to a common reference position.

The signal arising in the second member may be analysed in different ways depending on the nature of the first and second waveform signals. In one arrangement the first waveform signal is of a different phase to the second waveform signal, the analyser means analysing the signal arising in the second member by comparing the phase of the first or second waveform signal to the phase of the signal arising in the capacitively coupled second member.

Most conveniently the first and second waveform signals are 90° out of phase with each other.

In one embodiment the first and second members are relatively flat and parallel with there being an air space or insulation between them, the first member comprising four isolated electrically conducting parts arranged in a generally rectangular array and isolated from each other by an insulating means which is of a generally cross shaped configuration.

The switch means may be arranged to provide the first waveform signal selectively to the first part, and the second or fourth part, and the second waveform signal selectively to the third, and fourth or second part, respectively so that X-Y positional information may be obtained.

Although the switch means may be a manually operable switch, preferably the switch means comprises an electronic switch which provides the first or first and second waveform signals to the selected parts of the first member automatically in sequence. For example such a switch may be a multiplexer under computer control in synchronism with means which determine whether the device output signal contains X or Y positional information for example. Thus the operating condition of the switch may be changed as often as necessary to obtain X-Y or other bi-directional information at a required rate.

According to a second aspect of the invention I provide a method of obtaining information relating to the relative positions of first and second members utilising a device comprising a first member comprising at least three isolated electrically conducting parts, and a second member being electrically conducting and adjacent to and capacitively coupled to the first member, oscillator means to provide a first waveform signal to one of the parts of the first member and a second waveform signal to another of the parts of the first member, means to analyse a signal arising in the capacitively coupled second member to provide a device output signal characterised in that the method comprises relatively moving the first and second members such that the proportions of each of the respective parts of the first member in overlapping relationship with the second member are varied, operating a switch means in a first condition so that the first waveform signal is selectively applied to a first part of the first member while the second waveform signal is applied to a second part of the first member, analysing the signal arising in the capacitively coupled second member to provide a device output signal which contains information relating to the relative positions of the first and second members in a first direction, and operating the switch means in a second condition so that the first waveform signal is applied to another part of the first member while the second waveform signal is applied to a different one of the parts of the first member, analysing the signal arising in the capacitively coupled second member to provide a device output signal which contains information relating to the relative positions of the first and second members in a second direction.

BRIEF DESCRIPTION OF THE DRAWINGS

The invention will now be described with reference to the accompanying drawings in which FIG. 1 is an illustrative plan view of part of a device in accordance with the invention;

FIG. 2 is an illustrative end view of the part of the device of FIG. 1;

DETAILED DESCRIPTION OF THE DRAWINGS

Figure 3:
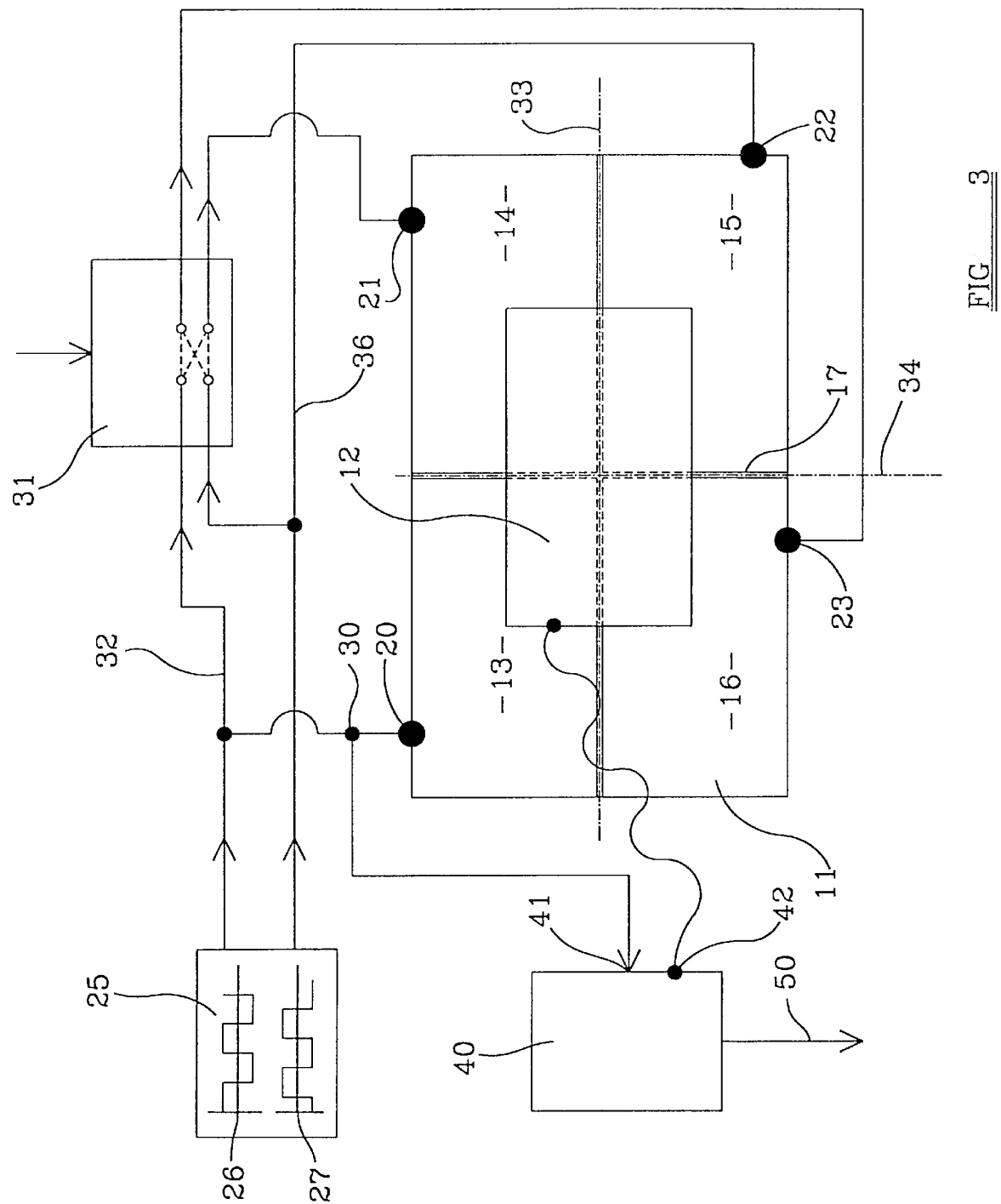
FIG. 3 is a diagram illustrating a possible electronic circuit for the device of FIGS. 1 and 2.

Referring to the drawings an input device 10 for inputting positional information into a computer, controller, game playing console or the like comprises a first member 11, and a relatively moveable second member 12. The first member 11 comprises in this example, four isolated electrically conducting generally flat parts 13, 14, 15 and 16 arranged in a generally rectangular array such that the parts 13 to 16 are isolated from one another by a generally cross shaped isolating element indicated at 17.

In this example, the second part 12 is moveable over the first part 11 by means hereinafter explained. The total area of the first part 11 is at least four times that of the area of the second member 12 in this example.

Conveniently the first member 11 is made from single sided printed circuit board material or is otherwise a mixed construction of conducting and insulating parts. The first part 11 may comprise a discrete member, or may comprise part of or an extension to an existing printed circuit board.

Each of the parts 13 to 16 of the first member 11 is provided with a connection 20 to 23 respectively.

The device 10 further comprises a quadrature oscillator signal source 25 which produces two substantially identical output signals 26 and 27, which are sine waves 90° out of phase with one another. One of the signals, namely the signal indicated at 26, is connected via a conductor 30 to the terminal 20 of the first part 13 of the first member 11. The signal 26 may, in dependence upon the condition of an electronic switch 31, simultaneously be connected via a conductor 32 either to the second part 14 of the first member 11, or the fourth part 16 of the first member 11 depending upon whether the device 10 is operating to provide positional information along an X axis indicated at 33, or a Y axis indicated at 34. The second signal 27 is connected via a conductor 36 to terminal 22 of the third part 15 of the first member 11, and depending upon the condition of the electronic switch 31, may simultaneously be connected either to terminal 21 of the second part of 14 of the first member 11, or to terminal 23 of the fourth pail 16 of the first member 11.

The device 10 further comprises a comparator means indicated at 40 which has a first input 41 connected to conductor 30 carrying the first signal 26 from the quadrature oscillator means 25 to the first member 11, and a second input 42 connected, in this example via a flexible wire 43 to the second member 12.

Of course, the second member 12 may be connected by any other desired kind of conductor to the input 42, such as conductor incorporating one or more wiping contacts or the like.

The second member 12 may also comprise a printed circuit board and is positioned adjacent to the first member 11 with there being an air gap 46 between the first 11 and second 12 members.

The second member 12 may be constrained by any desired known means to move relative to the first member 11 such that distance d between the first 11 and second 12 members remains substantially constant and the first member 11 and second member 12 remain substantially parallel.

It will be appreciated therefore that as the second member 12 is moved over the first member that the proportions of the respective parts 13–16 of the first member 11 in overlapping relationship with the second member 12 will be varied.

The air in the air gap 46 between the first 11 and second 12 members is a di-electric and as such, the first and second members 11, 12 will be capacitively coupled.

Of course, if desired, instead of providing an air gap between the first 11 and second 12 members, an insulating material may be provided. In one example, a polythene or other thin membrane may be place on the first member 11, and the second member may carry a conductive foam rubber which is moved over the first member 11 as the second member 12 moves. In that way, the spacing between the first and second members 11,12 would be retain constant during movement of the second member 12. Other arrangements are no doubt possible.

When the electronic switch 31 is in a condition such that the first signal 26 is connected to the two parts 13 and 16 and the second signal 27 is connected to the second and third parts 14, 15, movement of the second member 12 relative to the X axis 33 (ie. along the Y axis 34) will thus change the phase of the signal induced in the second member 12 by virtue of its capacitive coupling with the first member 11. Thus the comparator means 40, by comparing the relative phases of the first signal 26 and the signal from the second member 12, may provide an output signal 50 indicative of the relative position of the second member 12 to the first member 11 relative to the X axis 33. This assumes that the first and second signals 26,27 are not in anti-phase with each other.

When the electronic switch 31 is in a condition such that first signal 26 from the quadrature oscillating means 35 is connected to parts 13 and 14 of the first member 11, and the second signal is connected to third and fourth parts 15 and 16 of the first member, then the output signal 50 from the phase comparator 40 will be indicative of the relative position of the second part 12 relative to the Y axis 34 (ie. along the X axis 33).

When the device 10 is operating such that the output signal 50 is indicative of the position of the second member 12 relative to the X axis 33, it will be appreciated that movement of the second member 12 relative to the Y axis e.g. along the X axis 33 will not affect the phase of the signal arising in the second member 12 by virtue of its capacitive coupling to the first member 11, and conversely, when the output signal 50 is indicative of the position of the second member 12 relative to the Y axis 34, movement of the second member 12 relative to the X axis 33 e.g. along the Y axis 34 will not affect the phase if the signal axis in the second member 12.

The output signal 50 from the phase comparator 40 thus may, depending upon the condition of the electronic switch 31, be indicative of position of the second member 12 along the X or Y axes 33, 34.

The electronic switch 31 may be manually controlled but most conveniently, the electronic switch 31 is arranged to provide the respective first and second signals 26, 27 to the different parts 13 to 16 of the first member 11 automatically and in sequence. A multiplexer or like arrangement may therefore be provided as the electronic switch 31 and it will be appreciated that the output signal 50 may need appropriately to be switched to different inputs of a computer controller, game console or the like, which may thus utilise the output signal 50 appropriately to determine X-Y axis positional information.

The phase comparator 40 may compare the relative phases of the signals at the two inputs 41 and 42 by any applicable means such as a (software) timing loop or (hardware) ASIC counter or the like.

It will appreciated that in many items of electronic equipment or other apparatus which contain electronic control means, there will be an existing microcontroller or ASIC, and that the existing microcontroller or ASIC may be utilised both to obtain one or more waveform signals such as signals 26 and 27 for use in the device 10, and that the microcontroller or ASIC may also comprise the means necessary to determine the phase difference between the waveform signal provided to the first member 11, and the signal from the capacitively coupled second member 12.

It will be appreciated that the oscillator signal source 25 may provide appropriate waveform signals to a plurality of position sensing devices.

Various modifications may be made without departing from the scope of the invention.

In particular, the present invention has been described in the embodiment above with reference to a device for obtaining positional information along mutually generally orthogonal X and Y axis 33 and 34. The invention may be utilised to obtain other bi-directional information, and the directions may be linear or otherwise. For example, the device may provide positional information relative to three axes at 120° to one another in which case the first member may comprise three isolated electrically conducted parts in a suitably array.

In each such case, preferably the comparator means 40 measures phase difference between the two signals at the inputs 41 and 42, and two signals 26 and 27 preferably sine waves of the same wavelength and amplitude but out of phase but not in anti-phase are required. Preferably the two signals 26,27 are 90° out of phase.

A device in accordance with FIGS. 1 to 3 may be constructed in which the first member 11 has an area of about 25×20 mm. The quadrature oscillating means 25 may generate a sine wave signal or other suitable wave form, at a frequency of about 10 kHz. Stability of frequency is not critical but should remain stable whilst positional movement of the second member 12 relative to the first member is performed. The quadrature or other oscillator means 25 may generate the waveform signal or signals 26, 27 digitally, and the signals may then be filtered to provide a sine wave or other waveform as desired. Alternatively the oscillator signal or signals 26/27 may be generated by a linear oscillator.

Whereas it is preferred for the distance between the moving member 12 and the fixed member 11 to remain generally constant, slight variations in distance d during second member movement need not have a severe effect on the positional movement determined provided that the air gap 46 is sufficiently great.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof

I claim:

1. A device for obtaining information relating to the relative positions of first and second members, the first member comprising at least three isolated electrically conducting parts, and the second member being electrically conducting and adjacent to and capacitively coupled to the first member, the first and second members being relatively movable such that the proportions of each of the respective parts of the first member in overlapping relationship with the second member may be varied, oscillator means to provide a first waveform signal to one of the parts of the first member and a second waveform signal to another of the parts of the first member, means to analyse a signal arising in the capacitively coupled second member to provide a device output signal containing positional information and characterised in that a switch means is provided whereby when the switch means is in a first condition the first waveform signal is selectively applied to a first part of the first member while the second waveform signal is applied to a second part of the first member so that the device output signal contains information relating to the relative positions of the first and second members in a first direction, and when the switch means is in a second condition the first waveform signal is applied to another part of the first member while the second waveform signal is applied to a different part of the first member so that the device output signal contains information relating to the relative positions of the first and second members in a second direction.

2. A device according to claim 1 characterised in that when the switch means is in the second condition the second waveform signal is applied to the second part of the first member so that the positional information relating to the relative positions of the first and second members in the first and second directions can be related to a common reference position.

3. A device according to claim 1 characterised in that the first waveform signal is of a different phase to the second waveform signal, the analyser means analysing the signal arising in the second member by comparing the phase of the first or second waveform signal to the phase of the signal arising in the capacitively coupled second member.

4. A device according to claim 3 characterised in that the first waveform signal is 90° out of phase with the second waveform signal.

5. A device according to claim 1 characterised in that the first and second members are relatively flat and parallel with there being an air space or insulation between them.

6. A device according to claim 1 characterised in that the first member comprises four isolated electrically conducting parts arranged in a generally rectangular array and isolated from each other by an insulating means which is of a generally cross shaped configuration.

7. A device according to claim 6 characterised in that the switch means provides the first waveform signal selectively to the first part and the second or fourth part and the second waveform signal selectively to the third and fourth or second part respectively.

8. A device according to claim 1 characterised in that the switch means comprises an electronic switch which provides the first or first and second waveform signals to the selected parts of the first member automatically in sequence.

9. A method of obtaining information relating to the relative positions of first and second members utilising a device comprising a first member comprising at least three isolated electrically conducting parts, and a second member being electrically conducting and adjacent to and capacitively coupled to the first member, oscillator means to provide a first waveform signal to one of the parts of the first member and a second waveform signal to another of the parts of the first member, means to analyse a signal arising in the capacitively coupled second member to provide a device output signal characterised in that the method comprises relatively moving the first and second members such that the proportions of each of the respective parts of the first member in overlapping relationship with the second member are varied, operating a switch means in a first condition so that the first waveform signal is selectively applied to a first part of the first member while the second waveform signal is applied to a second part of the first member, analysing the signal arising in the capacitively coupled second member to provide a device output signal which contains information relating to the relative positions of the first and second members in a first direction, and operating the switch means in a second condition so that the first waveform signal is applied to another part of the first member while the second waveform signal is applied to a different one of the parts of the first member, analysing the signal arising in the capacitively coupled second member to provide a device output signal which contains information relating to the relative positions of the first and second members in a second direction.

* * * * *